Patented June 6, 1950

2,510,748

UNITED STATES PATENT OFFICE 2,510,748

PREPARATION OF COLD SWELLING STARCH-ALDEHYDE COMPOSITIONS

Jan Lolkema, Hoogezand, and Willem Albertus van der Meer, Haren, Netherlands, assignors to Naamlooze Vennootschap: W. A. Scholten's Chemische Fabrieken, Groningen, Netherlands, a corporation of the Netherlands No Drawing. Application November 1, 1946, Serial No. 707,326. In the Netherlands June 18, 1945

4 Claims. (Cl. 260—233.3)

U. S. Patent No. 2,246,635 describes a process of manufacturing starch products the solutions of which when dried will produce water resistant layers, which process is characterized by adding to cold swelling starch before or during the manufacturing thereof an aldehyde, particularly formaldehyde, or a substance producing aldehyde by decomposition. The patent also relates to the manufacture of solutions of such starch products.

For the manufacture of cold swelling starch a mixture of starch or a starch derivative with a limited quantity of water is heated on a rotary drum to a temperature above the gelatinizing point, while pressing the mass under mechanical pressure to form a thin layer, which is dried simultaneously or immediately thereafter. The said patent is based upon the discovery that, if an aldehyde, more particularly formaldehyde, is added to a mixture that is submitted to the cold swelling starch process, insoluble condensation products of starch and aldehyde will not yet be formed during the short heating treatment to a high temperature; it was found that the starch products manufactured in this way like ordinary cold swelling starch, have the property of dissolving, or swelling in cold water. Insoluble products are only formed by dissolving the same in water and drying the solution by heating, preferably in the presence of a catalyst and subsequently heating the same for some time to a high temperature if necessary. It is therefore possible to obtain water resistant layers in a very simple manner by the use of the said starch products, so that they will constitute valuable finishing, sizing and binding agents and adhesives.

The formation of the insoluble products with formaldehyde is most likely based upon the formation of bridges, e. g. methylene ether bridges, between the starch molecules, this process being accelerated by the presence of catalysts, more particularly acids.

U. S. patent application Serial No. 707,321, describes an improvement of the said process which consists in that the heating process for the preparation of the cold swelling starch is effected in a neutral or an alkaline medium.

In actual practice commercial formalin was used for the preparation of formaldehyde-cold swelling starches according to U. S. Patent No. 2,246,635 and commercial formalin as a rule contains a small amount of acid (formic acid), while the native starch itself may also show a slightly acid reaction on account of acids present therein, such as amylophosphoric acid. This small proportion of acid was the cause of a certain condensation and consequently of a reduction of the solubility during the process of manufacturing the cold swelling starch, so that it was only possible to obtain preparations with good swelling properties, when adding less than 10% of formaldehyde, calculated on the starch. If, according to U. S. patent application Serial No. 707,321 the cold swelling starch process is carried out in a neutral or alkaline medium, it will be possible still to obtain readily soluble aldehyde-cold swelling starches with considerably larger proportions of formaldehyde, e. g. 40%.

It has now been found that even in a slightly acid medium i. e. with a pH between 5 and 7 with a proportion of aldehyde of more than 10% it will be possible to obtain readily soluble products, if the cold swelling starch process is carried out at temperatures below 140° C. Although in U. S. patent No. 2,246,635 and in U. S. patent application Serial No. 707,321 it is not positively stated that the treatment is effected at higher temperatures, both cases refer to the ordinary cold swelling starch process, in which the starch layer on the cylinders during the drying treatment acquires a temperature of about 160–170° C. It has now been found that the temperature during the cold swelling starch process greatly influences the solubility of the dry product and that this solubility decreases in proportion to the increase in temperature during the drying treatment. If the process is carried out at low temperatures, e. g. by employing cylinders having a steam pressure of 2–3 atm., there will be formed even in a slightly acid medium and with a large proportion of formaldehyde, preparations that are still sufficiently soluble.

It is obvious that the use of comparatively low temperatures during the cold swelling starch process, not only in an acid medium, but also in a neutral or alkaline medium will have a favourable influence; the effect is, however, of less importance, since in this case there will be formed, even at higher temperatures products the solubility of which is satisfactory.

The influence of the temperature during the cold swelling starch process on the solubility of the final products is demonstrated by the following experiments:

Mixtures of potato starch and formaldehyde in a proportion of 20%, calculated on the starch, were submitted to the cold swelling starch process at pH-values of 5, 7 and 10, and with steam pressures in the cylinder of 2 and of 8 atm., corresponding to temperatures of about 130° and 175° C., respectively.

With a pH of 5 and a pressure of 2 atm. one obtains an aldehyde-cold swelling starch that will completely, though slowly swell in water. It is even possible in this case to obtain a soluble product from a mixture containing 40% of formaldehyde, instead of 20%. At a pressure of 8 atm. and pH value of 5 one obtains, on the contrary, insoluble preparations which will only swell to a very limited degree in water.

Mixtures having a pH value of 7 or of 10 respectively will at a steam pressure of 2 atmospheres give products that are highly soluble and will swell quickly. If, however, the steam pressure is increased to 8 atm. the final products will swell far more slowly, but still completely.

Summarizing, it may therefore be stated that in a slightly acid medium (pH 5-7) and with larger proportions of an aldehyde, soluble products are only obtained when the drying treatment is carried out at a low temperature, whereas in a neutral or an alkaline medium, even at high temperatures, soluble aldehyde-cold swelling starches are formed which, however, will swell or dissolve more slowly than preparations formed at lower temperatures in otherwise similar conditions.

The manufacture of the aldehyde-cold swelling starches may be effected on the known one- or two-cylinder drying devices, at such steam pressures that the temperature of the layer will not exceed e. g. 130° C. One may also use vacuum drum drying devices by means of which it is possible to carry out the cold swelling starch manufacturing process even at temperatures below 100° C.

For particulars regarding the manufacture and the use of the formaldehyde-cold swelling starches, we may refer to U. S. Patent No. 2,246,635 and U. S. patent application Serial No. 707,321 in which the use of higher temperatures is considered. The aldehyde e. g. may be used in the shape of compounds that will produce the aldehyde by decomposition, such as e. g. hexamethylene tetramine, paraformaldehyde or trihydroxy methylene, while instead of native starch decomposed starches, such as soluble starch, may be used. In order to promote the reaction acids or acid producing compounds are preferably used. This catalyst may already be present in the dry product, which may be accomplished by manufacturing two cold swelling starch preparations, one of which contains the aldehyde, while the other contains the catalyst.

One may also add substances which will form synthetic resin like condensation products with the aldehyde, such as e. g. phenols or amino compounds. The possibilities for using the products according to the invention are the same as for those described in U. S. Patent No. 2,246,635 and U. S. patent application Serial No. 707,321.

As first materials for the process according to the invention starch derivatives in the broadest sense of the term may be used and the said term does not only include the native starches and hydrolysis and/or oxidation products of starch, but e. g. also ethers and/or esters of starch containing free hydroxyl groups.

The invention will be explained with the aid of the following examples.

*Example 1*

1000 parts by weight of potato starch are suspended in a mixture of 500 parts by volume of a 40% by volume solution of formaldehyde and 1000 parts by volume of water. This suspension is given a pH of 6 by means of dilute caustic soda solution and subsequently converted into cold swelling starch on a heated, rotating cylinder, in the usual manner but at a temperature of approximately 120°-130° C. The cold swelling starch thus formed will dissolve completely in 8-10 parts of cold water to a viscous, smooth and transparent solution.

If the cold swelling starch process is carried out at 170°-180° C., while conditions are the same in other respects, one will obtain an insoluble product that will swell in water only to a very limited degree.

*Example 2*

The process is carried out in the same manner as according to Example 1, but the suspension is converted into cold swelling starch at a pH of 7. One obtains a formaldehyde-cold swelling starch that will quickly swell or dissolve in 8-10 parts of cold water to a viscous, transparent, perfectly smooth solution.

If the cold swelling starch process is carried out at a temperature of about 180° C., one will obtain, under conditions similar in other respects, a product which is still soluble in cold water, but which will swell or dissolve very slowly and which with 8 parts of water will produce a very viscous paste of a coarse structure.

*Example 3*

1000 parts by volume of a 40% commercial formaldehyde solution are diluted with 500 parts by volume of water, after which 1000 parts by weight of tapioca flour are suspended in this solution. The suspension is given a pH of 5.5 and then converted into cold swelling starch at a temperature of approximately 120° C. The hydroxymethyl ether of starch thus prepared will readily dissolve in 8-12 parts of cold water to a viscous, transparent and smooth solution.

*Example 4*

Operations are carried out in the same manner as according to Example 3, but the suspension submitted to the process of manufacturing cold swelling starch has a pH of 9. In this manner one obtains a formaldehyde-cold swelling starch which is easily soluble in cold water and produces perfectly smooth pastes. If, however, the cold swelling starch process is carried out under the same conditions, but at elevated temperatures, e. g. at 150°-160° C., one will obtain a less readily soluble and slowly swelling product, which when stirred in cold water will not produce a perfectly smooth paste.

We claim:

1. A process of manufacturing cold swelling starch preparations, the solutions of which when dried will produce water resistant layers, comprising adding to a starch product a limited quantity of water and at least 10% of an aldehyde, calculated on the weight of the dry starch product, adjusting the mixture to a pH of at least 5 and heating the same on a rotating cylinder to a temperature above the gelatinizing point of starch but not exceeding 140° C., while pressing the mass under mechanical pressure to form a thin layer which is simultaneously dried and subsequently comminuted.

2. A process as set forth in claim 1 in which the aldehyde is added in the form of an aldehyde-producing substance.

3. A process as set forth in claim 1 wherein said aldehyde is formaldehyde.

4. A process as set forth in claim 1 wherein the starch, aldehyde and water has a pH value of between 5 and 7.

JAN LOLKEMA.
WILLEM ALBERTUS VAN DER MEER.

REFERENCES CITED

The following references are of record in the file of this patent:

UNITED STATES PATENTS

| Number | Name | Date |
|---|---|---|
| 602,697 | Classen | Apr. 19, 1898 |
| 826,881 | French | Apr. 12, 1938 |
| 2,099,765 | Freiherr et al. | Nov. 23, 1937 |
| 2,417,611 | Pierson | Mar. 18, 1947 |

OTHER REFERENCES

Blanksma, Rec. Trav. Chim., v. 48 (1929), p. 351–360, 10 pages.